(12) United States Patent
Roy

(10) Patent No.: US 10,956,624 B2
(45) Date of Patent: Mar. 23, 2021

(54) ANTI-THEFT DEVICE

(71) Applicant: Niloy Roy, Atlanta, GA (US)

(72) Inventor: Niloy Roy, Atlanta, GA (US)

( * ) Notice: Subject to any disclaimer, the term of this patent is extended or adjusted under 35 U.S.C. 154(b) by 0 days.

(21) Appl. No.: 16/150,983

(22) Filed: Oct. 3, 2018

(65) Prior Publication Data
US 2019/0228189 A1  Jul. 25, 2019

Related U.S. Application Data

(60) Provisional application No. 62/620,760, filed on Jan. 23, 2018.

(51) Int. Cl.
*G08B 13/14* (2006.01)
*G06F 21/88* (2013.01)
*G06F 21/32* (2013.01)
*E05B 73/00* (2006.01)
*G08B 21/02* (2006.01)

(52) U.S. Cl.
CPC .......... *G06F 21/88* (2013.01); *E05B 73/0082* (2013.01); *G06F 21/32* (2013.01); *G08B 13/1427* (2013.01); *G08B 21/0261* (2013.01); *G08B 21/0269* (2013.01)

(58) Field of Classification Search
CPC ...... G06F 21/88; G06F 21/32; E05B 73/0082; G08B 13/1427
See application file for complete search history.

(56) References Cited

U.S. PATENT DOCUMENTS

| | | | | |
|---|---|---|---|---|
| 6,011,471 A * | 1/2000 | Huang | ............... | G08B 13/1418 340/539.1 |
| 6,954,147 B1 * | 10/2005 | Cromer | ................... | G06F 21/88 340/568.1 |
| 7,009,512 B2 * | 3/2006 | Cordoba | ............ | G08B 13/1427 340/539.23 |
| 7,375,638 B2 * | 5/2008 | Light | ................. | G08B 13/1427 340/572.1 |
| 8,321,124 B2 * | 11/2012 | Curatolo | ............... | G01S 5/0036 701/300 |
| 2002/0113705 A1 * | 8/2002 | Wallace | .................... | G08B 6/00 340/568.7 |
| 2002/0190861 A1 * | 12/2002 | Wentworth | ........ | G08B 21/0216 340/568.1 |
| 2004/0012495 A1 * | 1/2004 | Hammond | ............. | A45C 13/24 340/568.7 |
| 2006/0202817 A1 * | 9/2006 | Mackenzie | ............ | G06Q 10/08 340/539.13 |
| 2012/0313784 A1 * | 12/2012 | Malhotra | ........... | G08B 13/1436 340/568.1 |
| 2015/0321616 A1 * | 11/2015 | Puett | ........................ | B60R 7/08 224/309 |

* cited by examiner

*Primary Examiner* — Phung Nguyen
(74) *Attorney, Agent, or Firm* — Ballard Spahr LLP

(57) ABSTRACT

Disclosed are methods and apparatuses relating to an anti-theft device. An anti-theft device can be affixed to a tablet or laptop. The anti-theft device can determine if a distance relative to a reference point exceeds a threshold. An alarm state can be entered.

20 Claims, 12 Drawing Sheets

ANTI-THEFT DEVICE

CROSS-REFERENCE TO RELATED APPLICATION

This application claims priority to, and the benefit of the filing of U.S. Provisional Application No. 62/620,760, filed Jan. 23, 2018, which is incorporated by reference herein in its entirety.

BACKGROUND

Laptops, tablet computers, and other devices are vulnerable to theft. The risk of theft arises when a user or owner of these devices leaves these devices unattended.

SUMMARY

It is to be understood that both the following general description and the following detailed description are exemplary and explanatory only and are not restrictive. Provided are methods and apparatuses relating to an anti-theft device. A method can comprise: determining, by an anti-theft device, a reference point; determining, by the anti-theft device, that a distance of the anti-theft device relative to the reference point satisfies a threshold; and entering, by the anti-theft device, an alarm state in response to the distance satisfying the threshold.

An apparatus can comprise: a protective enclosure; a clip attachment interlocked with the protective enclosure; a controller housed within the protective enclosure, wherein the controller is configured to at least: determine a reference point; determine that a distance of the apparatus relative to the reference point satisfies a threshold; and enter an alarm state in response to the distance satisfying the threshold.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
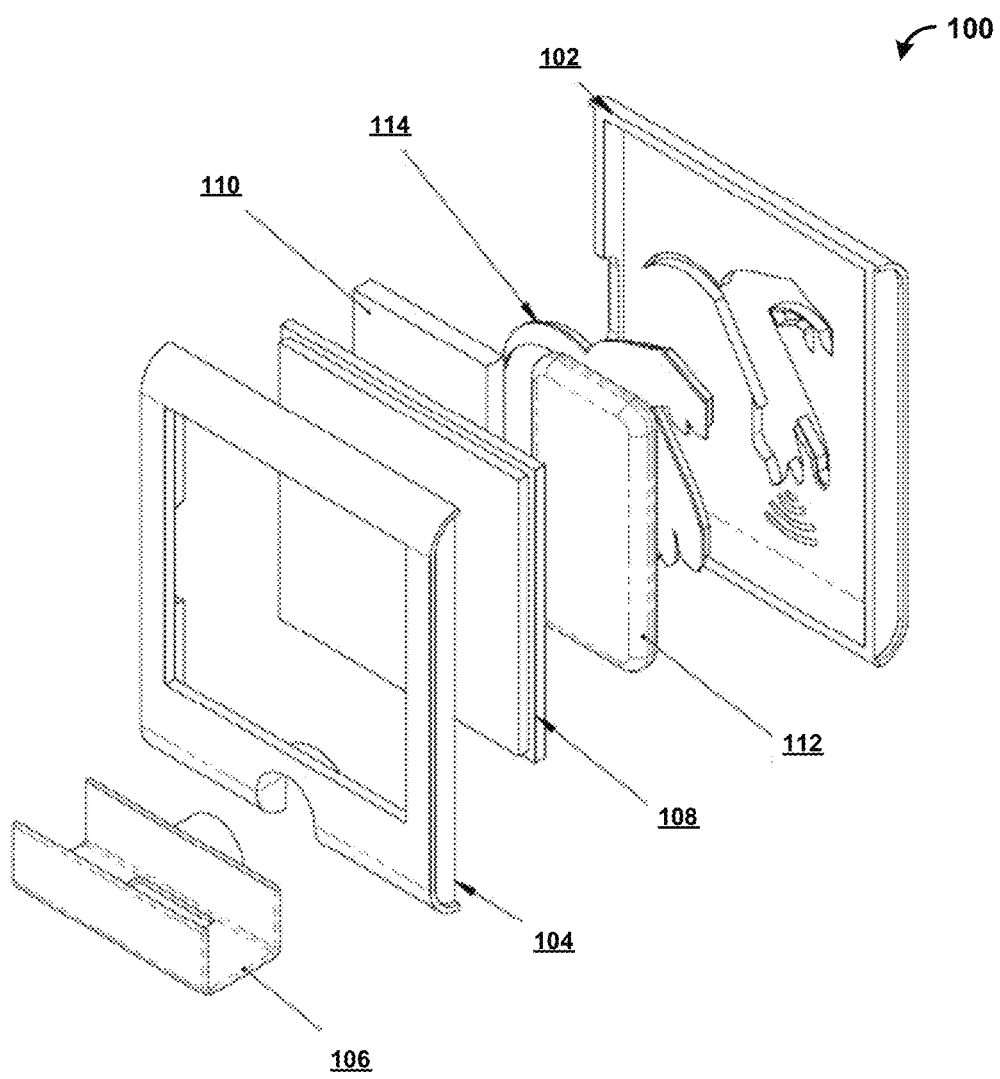
FIG. 1 is an example diagram of an anti-theft device.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Note that in various instances this detailed disclosure may refer to a given entity performing some action. It should be understood that this language may in some cases mean that a system (e.g., a computer) owned and/or controlled by the given entity is actually performing the action.

The present disclosure relates to an anti-theft device. In a preferred embodiment, the anti-theft device can be used to prevent the theft of laptop or tablet computing devices.

The anti-theft device can be affixed to a computing device by one or more clips. The clips can be connected to each other using a zip tie, cable, strap, or other securing mechanism. When armed, the anti-theft device can determine whether a distance between the anti-theft device and a reference point exceeds a threshold. For example, the anti-theft device can use a Global Positioning System (GPS) radio to establish the reference point as an initial location of the anti-theft device. The anti-theft device can then use the GPS radio to compare a current location to the reference point. As another example, the anti-theft device can be paired or otherwise in communication with a user device, such as a tablet computer or mobile phone. The current location of the user device can then be considered the reference point. The anti-theft device can then compare a current location of the anti-theft device to the current location of the user device. As a further example, the anti-theft device can determine whether a distance between the anti-theft device and a reference point exceeds a threshold by measuring a signal strength to the user device and determining whether the signal strength falls below a threshold. When the distance between the anti-theft device and a reference point exceeds a threshold, an alarm can be triggered. These and other features are set forth below.

FIG. 1 is an example diagram of an anti-theft device 100. The diagram of FIG. 1 depicts the anti-theft device 100 disassembled to show the component parts. The rear outer shell 102 and front outer shell 104 serve to encase one or more components of the anti-theft device 100. In an aspect, the rear outer shell 102 and front outer shell 104 can be composed of plastic, metal, or another sufficiently durable and tamper-resistant material. In an example aspect, the rear outer shell 102 can include a transparent portion, gap, or hole, allowing an optional logo light 114 to be seen. The logo light 114 can include one or more light emitting diodes (LEDs) or other illuminating components. The inclusion of a visible logo light 114 notifies persons viewing the anti-theft device 100 is present, thereby deterring theft.

The front outer shell 104 can include a hole or gap allowing physical access to a display device 108. In the alternative, the front outer shell 104 can include a transparent layer, such as a transparent capacitive later, allowing for physical interaction with the display device 108. In an aspect, the display device 108 can include a touch screen display that can accept one or more user inputs. The display device 108 can include a biometric sensor facilitating an arming of the anti-theft device 100. The biometric sensor can include, for example, a finger print reader, camera configured to perform facial recognition, an infrared scanner, or other biometric sensor. All or a portion of the display device 108 can be encased by the rear outer shell 102 and front outer shell 104.

Encased by the rear outer shell 102 and front outer shell 104 is a controller 110. The controller 110 can include a computing device, embedded computing device, printed circuit board (PCB), or other components facilitating the operation of the anti-theft device. Detailed descriptions of the controller 110 and its functions are set forth below. Also encased by the rear outer shell 102 and front outer shell 104 is a battery 112 coupled to the controller 110, display device 108, and/or the logo light 114. A clip 106 interlocks with the front outer shell 104 and serves to affix the anti-theft device 100 to a laptop or tablet computing device. In an aspect, the interlock between the clip 106 and front outer shell 104 can allow a rotation of the anti-theft device, e.g., by ninety degrees, or by one hundred and eighty degrees.

Figure 2A:
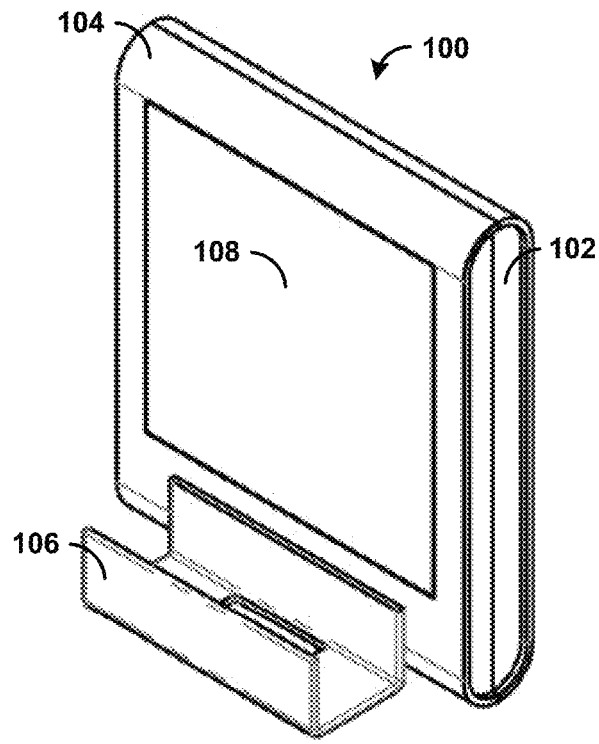
FIG. 2A is an example diagram of an anti-theft device.

FIG. 2A is an example view of an anti-theft device 100. Shown is the rear outer shell 102 and front outer shell 104 interlocked to form a protective shell around the internal components. The display device 108 is visible and/or accessible by virtue of a hole or transparent layer in the front outer shell 104. The clip 106 is shown as interlocked with the front outer shell 104.

Figure 2B:
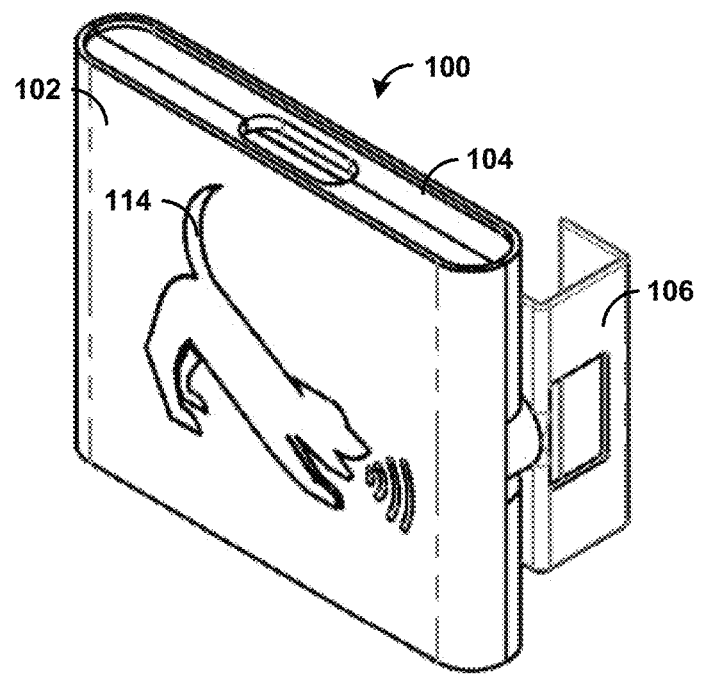
FIG. 2B is an example diagram of an anti-theft device.

FIG. 2B is an example view of an anti-theft device 100. Shown is the rear outer shell 102 and front outer shell 104 interlocked to form a protective shell around the internal components. The logo light 114 is visible by virtue of a hole or transparent layer in the rear outer shell 102. The clip 106 is shown as interlocked with the front outer shell 104.

Figure 3A:
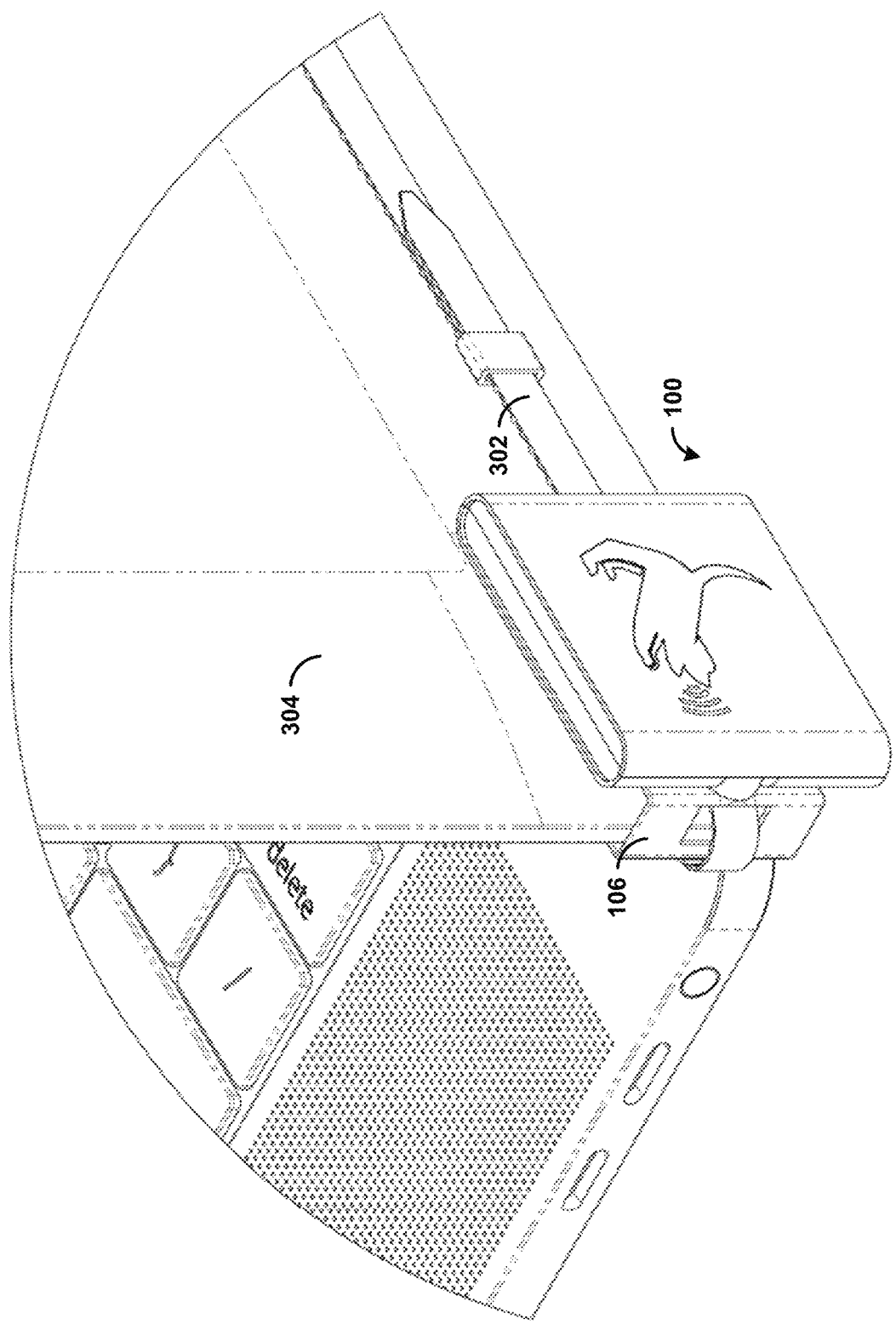
FIG. 3A is a pictorial depiction of an exemplary use of an anti-theft device.

FIG. 3A is a view of an example use of an anti-theft device 100. In this example use, the clip 106 anti-theft device 100 is secured to a laptop screen 304. A securing mechanism 302 serves to secure the clip 106 to the laptop screen 304. In an aspect, the securing strap 304 can include a zip tie, cable, strap, or other inelastic securing mechanism 302 as can be appreciated. As the clip 106 is affixed to the laptop screen 304 by the securing mechanism 302, the anti-theft device 100 cannot be easily removed from the computing device.

Figure 3B:
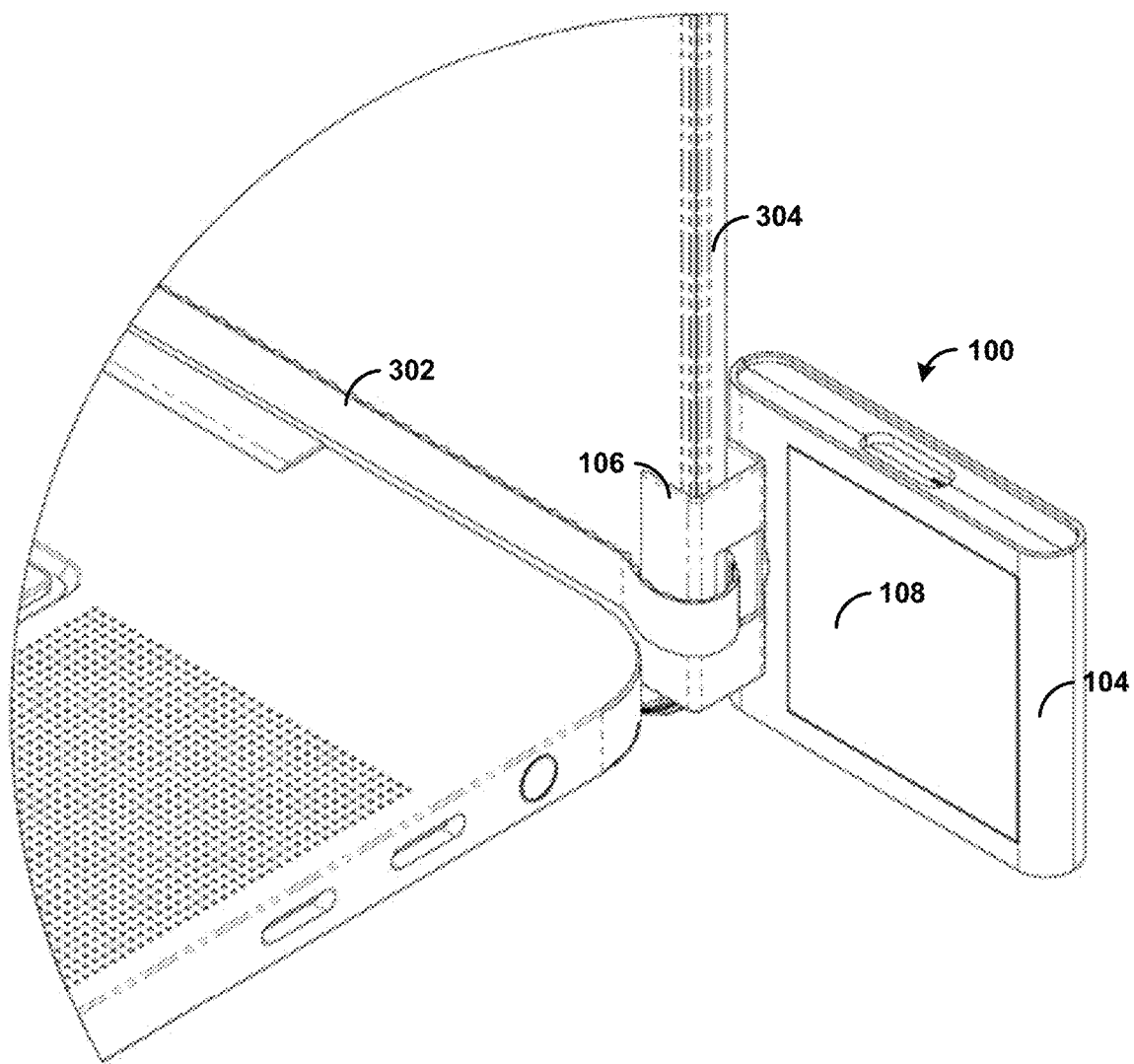
FIG. 3B is a pictorial depiction of an exemplary use of an anti-theft device.

FIG. 3B is a view of an example use of an anti-theft device 100. In this example use, the clip 106 anti-theft device 100 is secured to a laptop screen 304. A securing mechanism 302 serves to secure the clip 106 to the laptop screen 304. In this example view, the interlock between the clip 106 and the front outer shell 104 has allowed for a one hundred and eighty degree rotation of the anti-theft device 100, thereby allowing user access to the display device 108. This can facilitate an arming or other interaction with the anti-theft device.

Figure 4:
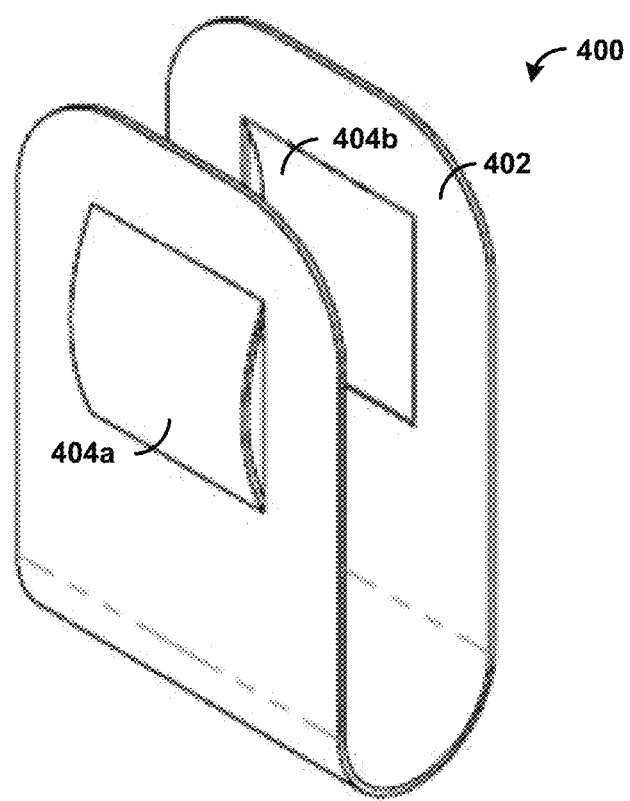
FIG. 4 is an example diagram of a secondary clip component of an anti-theft device.
Figure 5:
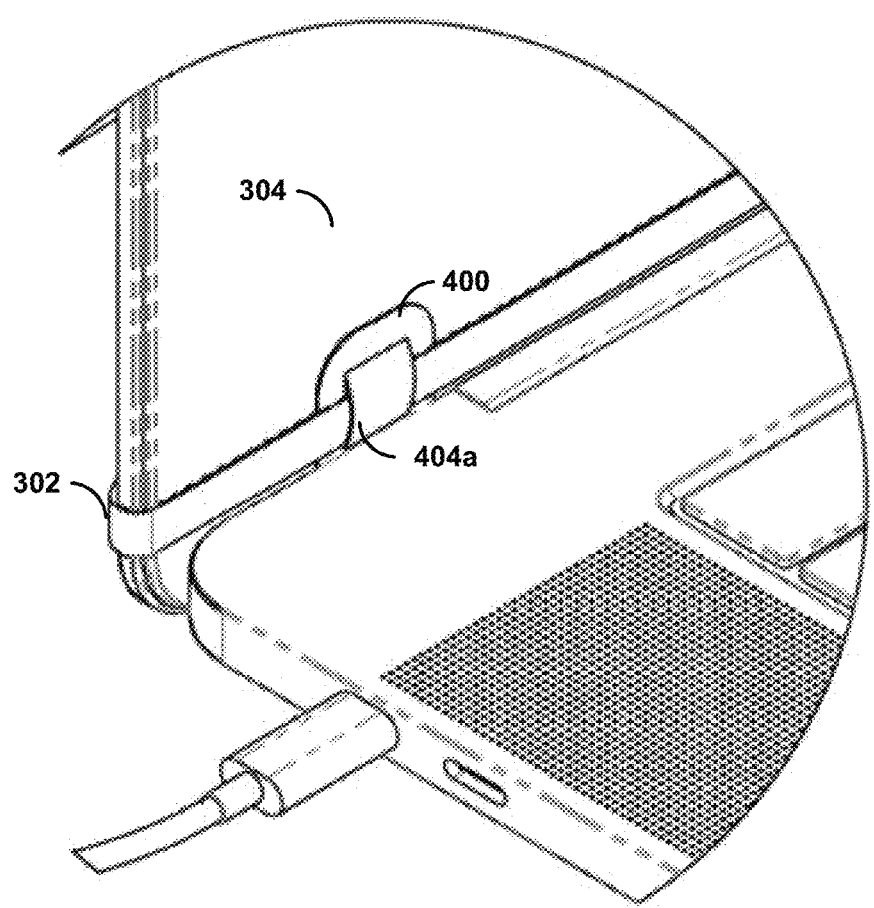
FIG. 5 is a pictorial depiction of an exemplary use of a secondary clip.

FIG. 4 is an example diagram of a secondary clip 400, use of which is set forth in FIG. 5. The secondary clip 400 serves to provide an additional point of attachment between a securing mechanism 302, the anti-theft device 100, and a computing device. The secondary clip 400 includes an inner face 402. In a preferred embodiment, on use, the inner face 402 of the secondary clip 400 will be flush to a font and rear face of a laptop screen or tablet. The secondary clip 400 can include loops 404a/b, through which a securing mechanism 302 can be run, thereby attaching the clip 400 to the securing mechanism 302.

FIG. 5 is a view of an example use of the secondary clip 400. Here, a securing mechanism 302 has been looped through the loop 404a. The secondary clip 400 is secured to a laptop screen 304. In this example use, the securing mechanism 302 can also be attached to an unshown clip 106 of an anti-theft device 100. The secondary clip 400 then serves to provide an additional interlock between the laptop screen 304 and the securing mechanism 302. Thus, the securing mechanism 302 cannot be removed from the laptop screen 304 by sliding the securing mechanism 302 to the top of the laptop screen 304.

Figure 6:
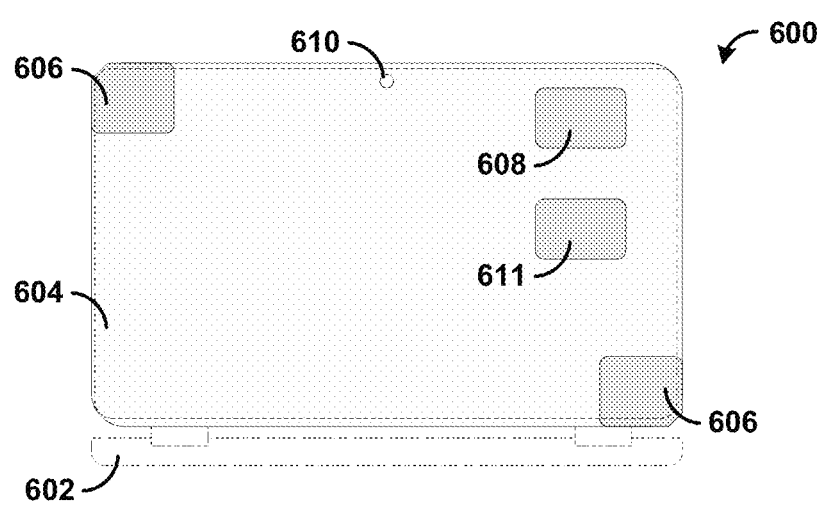
FIG. 6 is a pictorial depiction of an exemplary use of an anti-theft device.

FIG. 6 shows an alternative embodiment of an anti-theft device 600. In the anti-theft device 600 the logical and functional components (e.g., a controller 110, a battery 112) are encased in an enclosure 604. The enclosure 604 can be connected to, clipped to, locked to, or otherwise affixed to the rear portion of a laptop 602 display (e.g., the portion of the laptop 602 casing opposite to and containing the screen portion of the display). Accordingly, the enclosure 604 can be molded or configured to connect to a particular shape and/or style of display depending on the make and/or model of the laptop 602. Thus, the anti-theft device 600 can be attached to the laptop 602 while substantially preserving the width and height of the laptop 602 form factor, only increasing the thickness to as to encase the functional components of the anti-theft device 600.

The internal components of the anti-theft device 600 can include components similar and/or identical in functionality to the anti-theft device 100 (see FIG. 1). The anti-theft device 600 can also include one or more locking mechanisms 606 to affix the anti-theft device 600 to the display of the laptop 602. For example, the locking mechanisms 606 can include mechanical or electromechanical locks or other detents to prevent movement of one or more components of the locking mechanisms 606. Although FIG. 6 shows the anti-theft device with two locking mechanisms 606, it is understood that additional locking mechanisms 606 can also be used. When the anti-theft device 600 is in an "armed" state, the locks can be engaged (e.g., by the controller 110) to prevent unlocking and/or removal of the anti-theft device 600. The anti-theft device 600 can also include a display 611. The display 611 can include and/or be a liquid crystal display (LCD) screen (e.g., passive matrix, active matrix, etc.), light-emitting diode (LED) display, and/or any other display. The display 611 can display and/or indicate messages and/or notifications, such as a text messaging, an advertisement, an application notification, combinations thereof, and/or the like. The display 611 can be used to present advertising, branding, or other messages to observers. The anti-theft device 600 can also include a biometric sensor 608, which can include a finger print scanner or other type of sensor as can be appreciated. An input from the biometric sensor 608 can transition the anti-theft device 600 to or from an "armed" state. The anti-theft device 600 can also include a camera 610. The camera 610 can be configured to take one or more images. For example, if the anti-theft device 600 is in an "alarm" state, the camera 610 can capture images (e.g., at a predefined interval) to help show the current location of the laptop 602. The captured images can then be transmitted by the anti-theft device 600 to a server, a user device, or any other device.

The anti-theft device 600 can also include additional components. For example, the anti-theft device 600 can include a port (not shown), such as a Universal Serial Bus (USB) port, Thunderbolt port, or other port corresponding to a peripheral port of the laptop 602. The port can be connected to the corresponding peripheral port of the laptop 602 to draw power from the laptop 602 battery or power system in order to power the anti-theft device 600 and/or charge the battery 112.

Figure 7A:
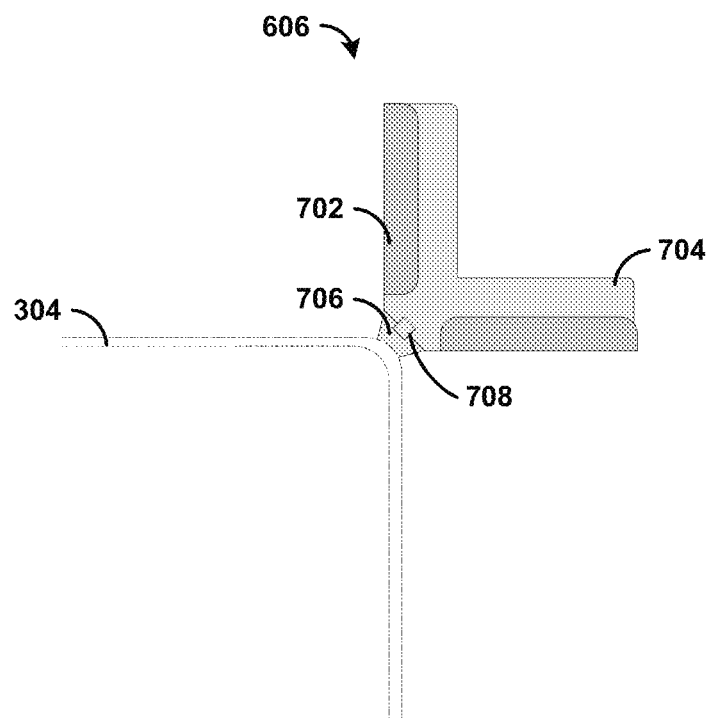
FIG. 7A is a pictorial depiction of a lock component of an anti-theft device.
Figure 7B:
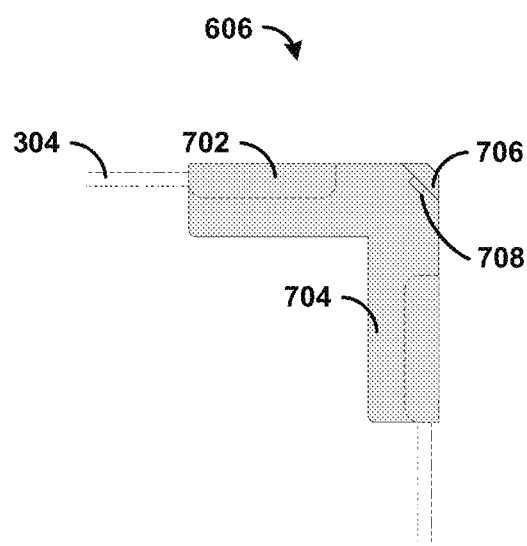
FIG. 7B is a pictorial depiction of a lock component of an anti-theft device.

FIG. 7A is a diagram of a locking mechanism 606 in an open or unlocked state. Here, the locking mechanism 606 is part of an anti-theft device 600 affixed to a laptop display 304. The locking mechanism can include a first attachment component 702, which can include a tooth, clip, ridge, or other component to securely attach the locking mechanism 606 to the laptop display 304 when the locking mechanism 606 is in a closed or locked state. A second attachment component 704 (e.g., a shaped piece of plastic, metal, or other suitably tamper-resistant material) will rest in front of the laptop display 304 in the closed or locked state. Thus, in a closed or locked state, a portion of the laptop display 304 will sit between the first attachment component 702 and the second attachment component 704, thereby attaching the anti-theft device 600 to the laptop display 304. The locking mechanism can also include a corner component 706 to connect the locking mechanism 606 to the anti-theft device 600 enclosure 604. The corner component 706 can be interlocked with one or more rotational components 708, which can include pins, axels, ratchets, or other rotational means allowing the locking mechanism to rotate into a closed or locked position, FIG. 7B shows the locking mechanism 606 in a closed or locked state. Here, the first attachment components 702 are positioned behind the laptop display 304, while the second attachment components 704 rest in front of the laptop display 304. The locking mechanism 606 has been rotated around the rotational component(s) 706 such that the corner component 706 is substantially perpendicular to the locking mechanism 606 (e.g., the second attachment component 704 and the enclosure 604.

Figure 9:
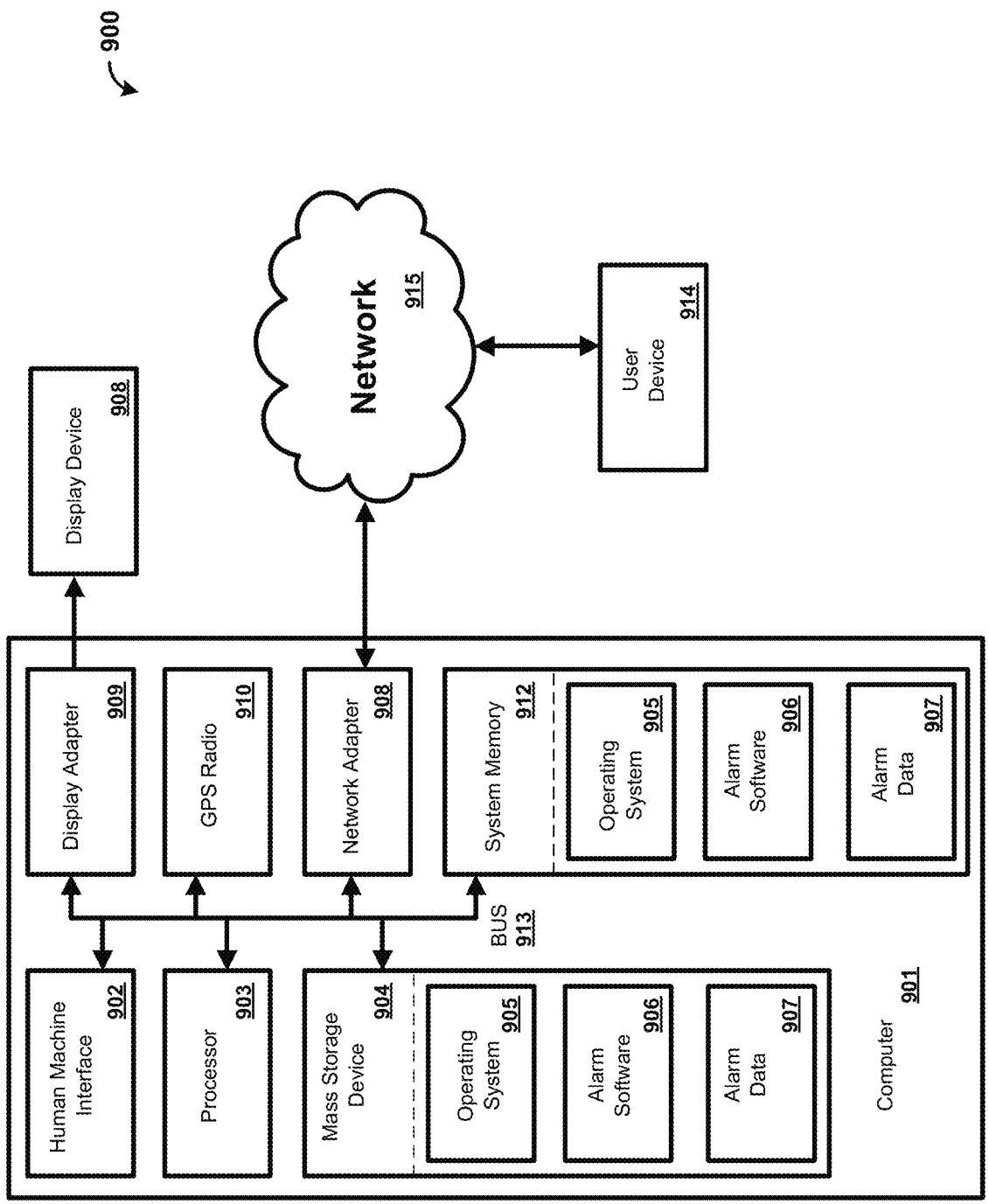
FIG. 9 is a block diagram of an example controller.

In an exemplary aspect, the methods and systems can be implemented on a computer 901 as illustrated in FIG. 9 and described below. By way of example, the controller 110 of FIG. 1 can be a computer as illustrated in FIG. 9. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Figure 8:
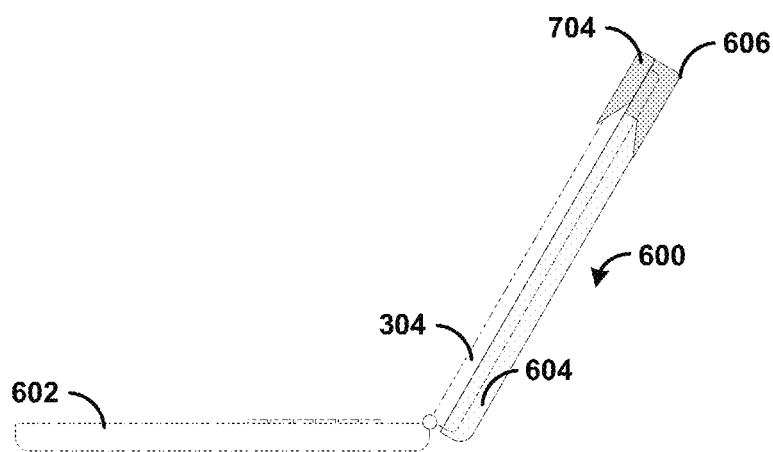
FIG. 8 is a pictorial depiction of an exemplary use of an anti-theft device.

FIG. 8 shows a side view of an anti-theft device 600 attached to a laptop display 304 of a laptop 602. Here, the laptop display 304 is shown resting in an indentation or socket of the enclosure 604, held in place by the locking mechanism 606. The second attachment component 704 of the locking mechanism 606 holds the laptop display 304 in the indentation, preventing removal of the anti-theft device 600.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. The system can utilize parallel computing.

The system bus 913 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 913, and all buses specified in this description can also be implemented over a wired or wireless network connection and each of the subsystems, including the one or more processors 903, a mass storage device 904, an operating system 905, alarm software 906, alarm data 907, a network adapter 908, the system memory 912, a Global Positioning System (GPS) radio 910, a display adapter 909, a display device 908, and a human machine interface 902, can be connected through buses of this form.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the alarm data 907 and/or program modules such as the operating system 905 and the alarm software 906 that are immediately accessible to and/or are presently operated on by the one or more processors 903.

In another aspect, the computer 901 can also comprise other removable/non-removable, volatile/non-volatile computer storage media. By way of example, FIG. 9 illustrates the mass storage device 904 which can provide non-volatile storage of computer code, computer readable instructions, data structures, program modules, and other data for the computer 901. For example and not meant to be limiting, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, the operating system 905 and the alarm software 906. Each of the operating system 905 and the alarm software 906 (or some combination thereof) can comprise elements of the programming and the alarm software 906. The alarm data 907 can also be stored on the mass storage device 904. The alarm data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 904 via an input device (not shown). These and other input devices can be connected to the one or more processors 903 via the human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, the display device 908 can also be connected to the system bus 913 via an interface, such as the display adapter 909. It is contemplated that the computer 901 can have more than one display adapter 909 and the computer 901 can have more than one display device 908. For example, the display device 908 can be a monitor or a touch screen interface. In such an example, the display adapter 909 can provide user inputs via the human machine interface 902. The display device 908 can also comprise one or more biometric sensors. A GPS radio 910 can be connected to the system bus 913.

Any step and/or result of the methods can be output in any form to an output device. Such output can be any form of visual representation, including, but not limited to, textual, graphical, animation, audio, tactile, and the like. The display device 908 and computer 901 can be part of one device, or separate devices.

The computer 901 can operate in a networked environment using logical connections to a user device 914. By way of example, a user device can be a personal computer, portable computer, smartphone, a server, a router, a network computer, a peer device or other common network node, and so on. Logical connections between the computer 901 and a user device 914 can be made via a network 915, such as a local area network (LAN) and/or a personal area network. Such network connections can be through the network adapter 908. The network adapter 908 is implemented wireless environments. For example, the network adapter 908 can include a Bluetooth™ adapter, and the network 915 connection can comprise a Bluetooth™ connection.

For purposes of illustration, application programs and other executable program components such as the operating system 905 are illustrated herein as discrete blocks, although it is recognized that such programs and components reside at various times in different storage components of the computing device 901, and are executed by the one or more processors 903 of the computer. An implementation of the alarm software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 10:
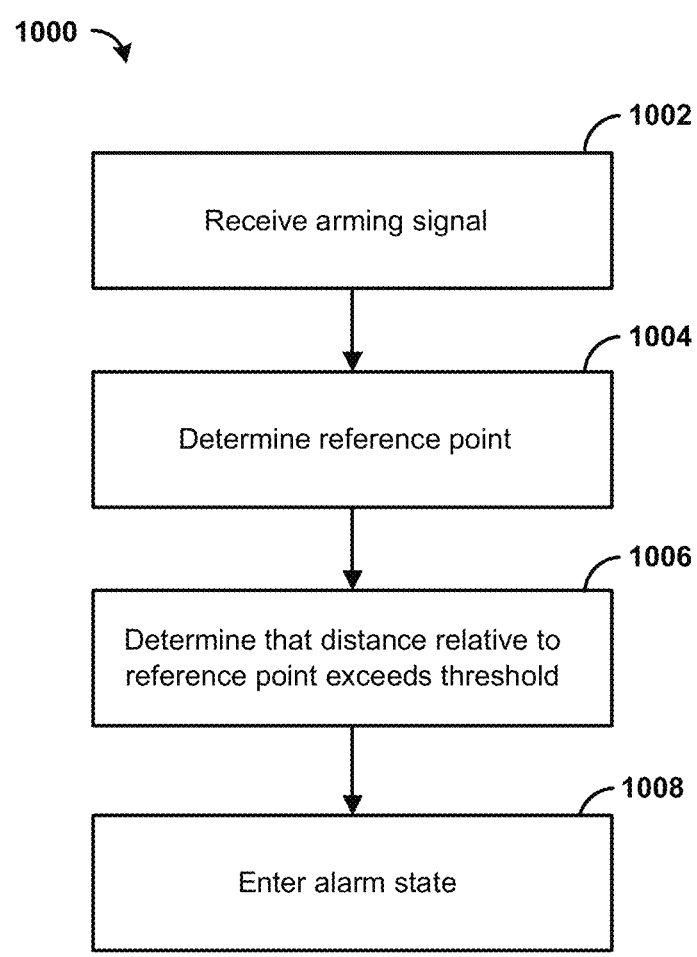
FIG. 10 is a flowchart of an example method.

FIG. 10 is a flowchart 1000 of an example method. Beginning at 1002 an anti-theft device (e.g., a controller 110 of an anti-theft device 100 and/or 600) receives an arming signal, thereby placing the anti-theft device in an armed state. In an aspect, receiving an arming signal can comprise receiving a user input. For example, the user input can comprise a selection of a button or other user interface element displayed on a display (e.g., the display 608, a display device 908, etc.). As another example, the user input can comprise a passcode, password, or other authorization credential.

In an aspect, the user input can comprise biometric data. For example, the display (e.g., the display 608, a display device 908, etc.) can comprise a fingerprint reader. The controller (e.g., controller 110, etc.) can then compare a detected fingerprint to one or more authorized fingerprints. In response to the detected fingerprint matching at least one of the one or more authorized fingerprints, the anti-theft device can enter the armed state.

The user input can also comprise an input to an application, web site, or other service associated with the anti-theft device. For example, the anti-theft device can be associated with a user account of an application or service. A user input to a user interface can cause the arming signal to be transmitted.

As a further example, the anti-theft device can comprise a camera and/or infrared scanner coupled to the controller (e.g., controller 110, etc.). The controller, via the camera and/or infrared scanner, can detect a face. The controller can then compare a detected face to one or more authorized faces. In response to the detected face matching at least one of the one or more authorized faces, the anti-theft device can enter the armed state.

In a further aspect, the anti-theft device can comprise a physical button, lock and key mechanism, or switch. In such an aspect, receiving the arming signal can comprise detecting an activation of the physical button, lock and key mechanism, or switch. In another aspect, the anti-theft device can be in network communication (i.e., "paired") with a user device (e.g., user device 914, etc.), e.g., by a Bluetooth™ connection or other wireless network connection. In such an aspect, receiving the arming signal can include receiving a transmission, data, or other signal from the user device indicating that the anti-theft device should enter the armed state. In response to entering the armed state, one or more locking mechanisms (e.g., the locking mechanism 606, etc.) can be engaged. For example, the controller can transmit a signal to one or more electromechanical locks or detents of the locking mechanisms to prevent movement of one or more components of the locking mechanisms and/or prevent removal of an anti-theft device (e.g., the anti-theft device 600, etc.) from a device (e.g., the laptop 602, a tablet, a smart device, etc.).

In step 1004 a reference point can be determined, e.g., by a controller (e.g., the controller 110, etc.). In an aspect, determining a reference point can comprise global positioning and/or geolocation (e.g., determining a location using a Global Positioning System (GPS) radio 610, etc.). Determining the reference point can be performed in response to a user input, e.g., to the display (e.g., the display 608, the display device 908, etc.). Thus, the anti-theft device can be considered "pinned" to the reference point. In another aspect, determining the reference point can comprise determining the reference point can comprise determining a location of a user device (e.g., the user device 914, etc.). For example, the controller can receive, e.g., via a network adapter (e.g., the network adapter 908), and the location of the user device from the user device. In an aspect, the user device can be a paired user device having a network connection to the anti-theft device (e.g., a controller 110 of an anti-theft device 100 and/or 600).

In step 1006 it can be determined, e.g., by the controller, that the distance of the anti-theft device relative to the reference point exceeds a threshold. In an aspect, the threshold can be predetermined. In another aspect, the threshold can be determined by a user, e.g., of the anti-theft device or a user device (e.g., the user device 914, etc.). In an aspect, this can include determining a current location of the anti-theft device. For example, the controller, via a GPS radio, can determine the current location of the anti-theft device. The current location can then be compared to the reference point to determine if the threshold has been exceeded. As another example, the controller can communicate with a user device to determine a distance relative to the user device when the user device defines the reference point.

At step 1008 an alarm state can be entered by the anti-theft device, e.g., by the controller (e.g., the controller 110, etc.). Entering the alarm state can comprise generating, by the anti-theft device, a noise or other audible sound. Entering the alarm state can comprise transmitting a notification to a user device (e.g., the user device 914, etc.), such as e.g., a paired user device, or another device such as a server. Entering the alarm state can comprise transmitting a current location of the anti-theft device a user device, e.g., a paired user device, or another device such as a server. Entering the alarm state can also comprise transmitting a notification to one or more associated user devices. For example, the one or more associated user devices can each correspond to a user account, and each of the accounts can be associated via blockchain, social networking, or otherwise associated. The notification can be transmitted to the one or more associated devices within a predefined distance of the reference point, thereby notifying other uses of a possible theft.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   determining, by an anti-theft device, a reference point;
   determining that a distance of the anti-theft device relative to the reference point satisfies a threshold;
   entering, based on the distance satisfying the threshold, an alarm state; and
   causing, based on the alarm state, at least a ninety degree rotation of a locking element, wherein the rotation of the locking element causes an interlock between a computing device and the anti-theft device.

2. The method of claim 1, wherein determining the reference point comprises determining a location of one or more of the computing device or the anti-theft device.

3. The method of claim 1, further comprising sending, based on the alarm state, a notification to another computing device.

4. The method of claim 1 further comprising sending, based on the alarm state, a notification via a display.

5. The method of claim 4, wherein determining the current location of the anti-theft device is facilitated by one or more of a Global Positioning System (GPS) radio, or a Bluetooth™ transceiver of the anti-theft device.

6. The method of claim 4, wherein the alarm state causes a camera to capture one or more images.

7. The method of claim 6, further comprising sending the one or more images to a network server.

8. The method of claim 4, wherein determining the current location of the anti-theft device is in response to a user input.

9. The method of claim 1, further comprising outputting, based on the alarm state, an audible notification.

10. The method of claim 1, wherein entering the alarm state comprises sending a current location of the anti-theft device to a user device.

11. An apparatus, comprising:
    a protective enclosure;
    a display;
    a controller housed within the protective enclosure, wherein the controller is configured to at least:
       determine a reference point;
       determine that a distance of the apparatus relative to the reference point satisfies a threshold;
       enter, based on the distance satisfying the threshold, an alarm state; and
       cause, based on the alarm state, at least a ninety degree rotation of a locking element, wherein the rotation of the locking element causes an interlock between a computing device and the apparatus.

12. The apparatus of claim 11, wherein the alarm state causes a camera to capture one or more images that are sent to a network server.

13. The apparatus of claim 11, further comprising a network adapter, wherein the controller is configured to establish a network connection with the computing device.

14. The apparatus of claim 13, wherein the controller is configured to:
    receive, from the computing device, via the network connection, a location of the computing device; and
    determine, as the reference point, the location of the computing device.

15. The apparatus of claim 13, wherein the network connection comprises a personal area network connection.

16. The apparatus of claim 15, wherein the personal area network connection comprises a Bluetooth™ connection.

17. The apparatus of claim 13, wherein entering the alarm state comprises sending a notification to the computing device via the network connection.

18. The apparatus of claim 11, wherein the interlock between the computing device and the apparatus is configured to prevent removal of the computing device from the apparatus.

19. The apparatus of claim 11, wherein the controller is further configured to output, based on the alarm state, an audible notification.

20. The apparatus of claim 11, where the display comprises one or more of a light emitting diode (LED) display, a liquid crystal display (LCD), or a biometric sensor.

* * * * *